(12) United States Patent
Wu et al.

(10) Patent No.: US 10,386,595 B2
(45) Date of Patent: Aug. 20, 2019

(54) SUPPORT MECHANISM

(71) Applicant: TDK TAIWAN CORP., Yangmei Taoyuan (TW)

(72) Inventors: Fu-Yuan Wu, Yangmei Taoyuan (TW); Yu-Shan Chou, Yangmei Taoyuan (TW); Haruo Taguchi, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 0 days.

(21) Appl. No.: 15/868,508

(22) Filed: Jan. 11, 2018

(65) Prior Publication Data

US 2018/0210160 A1    Jul. 26, 2018

Related U.S. Application Data

(60) Provisional application No. 62/450,198, filed on Jan. 25, 2017.

(30) Foreign Application Priority Data

Nov. 13, 2017   (CN) .......................... 2017 1 1116584

(51) Int. Cl.
*G02B 7/02* (2006.01)
*G02B 27/64* (2006.01)
*G03B 5/04* (2006.01)
*G02B 7/08* (2006.01)
*G02B 7/09* (2006.01)

(52) U.S. Cl.
CPC ............... *G02B 7/023* (2013.01); *G02B 7/08* (2013.01); *G02B 27/646* (2013.01); *G03B 5/04* (2013.01); *G02B 7/09* (2013.01); *G03B 2205/0015* (2013.01); *G03B 2205/0069* (2013.01)

(58) Field of Classification Search
CPC . G02B 7/023; G02B 7/08; G02B 7/04; G02B 7/102; H02K 41/0356
USPC ........................................................ 359/822
See application file for complete search history.

(56) References Cited

U.S. PATENT DOCUMENTS

2008/0239270 A1*  10/2008  Bischoff ................ G02B 7/008
                                                                355/67
2010/0091120 A1*   4/2010  Nagata .................. G02B 27/646
                                                               348/208.4

FOREIGN PATENT DOCUMENTS

TW           I578094 B      4/2017

* cited by examiner

*Primary Examiner* — Mohammed A Hasan
(74) *Attorney, Agent, or Firm* — Muncy, Geissler, Olds & Lowe, P.C.

(57) ABSTRACT

An optical mechanism is provided. The optical mechanism includes a fixed member, a movable member, an optical element, a first sensing magnet and a first sensing element, wherein the movable member is movably connected to the fixed member, and the optical element is disposed on the movable member. The first sensing magnet corresponds to the optical element and has a first magnetic polar direction. The first sensing element corresponds to the first sensing magnet for detecting the rotation of the first sensing magnet around a first axis direction relative to the fixed member, wherein the first axis is perpendicular to the first magnetic polar direction.

14 Claims, 8 Drawing Sheets

SUPPORT MECHANISM

CROSS-REFERENCE TO RELATED APPLICATIONS

The present application claims priority of U.S. Provisional Patent Application No. 62/450,198, filed on Jan. 25, 2017, and China Patent Application No. 201711116584.9 filed on Nov. 13, 2017, which are incorporated by reference herein in their entirety.

BACKGROUND OF THE INVENTION

Field of the Invention

The present invention relates to a support mechanism, and especially to a support mechanism for holding a lens.

Description of the Related Art

Figure 1:
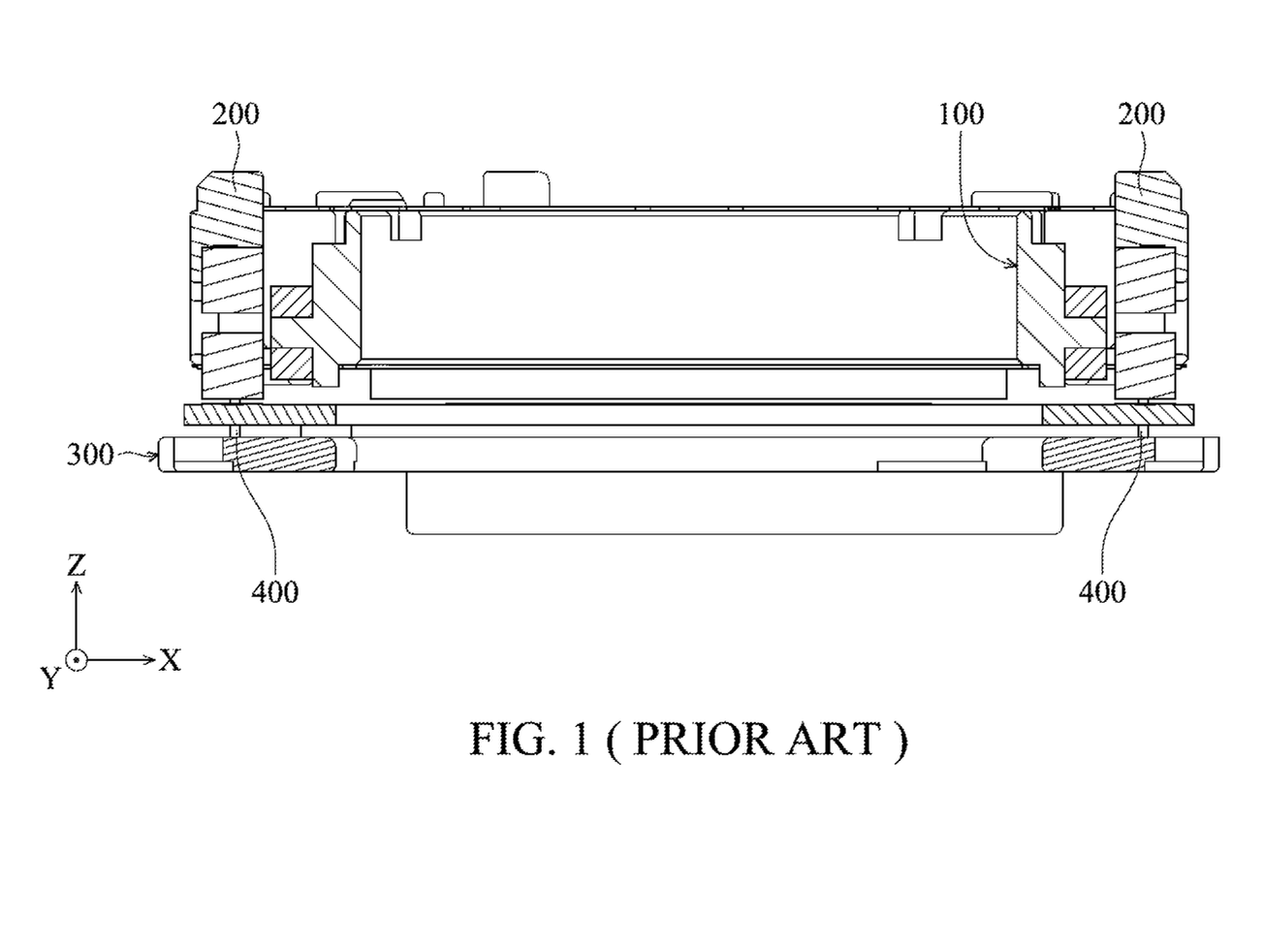
FIG. 1 is a cross-sectional view of a conventional support mechanism.

Conventional cameras, video recorders and mobile phones can often collide with other objects or be otherwise impacted by external forces. As a result, the inner optical system of such a device may vibrate, resulting in the image that is captured coming out blurry. Patent document TW 1578094 discloses an optical image stabilization device, wherein its inner coil may interact with a corresponding magnet after passing a current, which allows the lens holder secured to the coil to move along the optical axis of the lens and along a horizontal direction that is perpendicular to the direction of the optical axis. This achieves auto focus (AF) and optical image stabilization (OIS) functionality, and can lead to better image quality. As shown in FIG. 1, in a conventional optical image stabilization device, a lens is disposed in a lens holder 100, the lens holder 100 is movably disposed in the frame 200, wherein the frame 200 and the substrate 300 below the frame 200 extend along a vertical direction (Z axis direction) and are connected by a resilient suspension wire 400. However, this may make it hard to reduce the dimensions of the mechanism along the Z axis, which is a disadvantage to the goal of miniaturizing such products.

BRIEF SUMMARY OF THE INVENTION

To overcome these problems, an optical mechanism is provided in this invention. The optical mechanism includes a fixed member, a movable member, an optical element, a first sensing magnet and a first sensing element. The movable member is movably connected to the fixed member, and the optical element is disposed on the movable member. The first sensing magnet corresponds to the optical element and has a first magnetic polar direction. The first sensing element corresponds to the first sensing magnet for detecting the rotation of the first sensing magnet around a first axis direction relative to the fixed member, wherein the first axis is perpendicular to the first magnetic polar direction.

In an embodiment, the resilient element includes a first connecting surface and a second connecting surface, the first connecting surface is fixed on the outer surface of the movable module, and the second connecting surface is fixed on the inner surface of the fixed module.

In an embodiment, the first connecting surface and the second connecting surface are not perpendicular to an optical axis of the lens.

In an embodiment, the resilient element further includes two second connecting surfaces, and the first connecting surface is between the second connecting surfaces.

In an embodiment, the first connecting surface is fixed on the center position of the outer surface of the movable module.

In an embodiment, the resilient element further includes two first connecting surfaces, and the second connecting surface is between the first connecting surfaces.

In an embodiment, the first connecting surfaces are fixed on two opposite ends of the outer surface of the movable module.

In an embodiment, the resilient element is longitudinal and has a U-shaped structure connecting the movable module or the fixed module.

In an embodiment, the support mechanism further includes two resilient elements connecting different sides of the movable module, and the resilient elements are perpendicular to each other.

In an embodiment, the support mechanism further includes a spring connecting the movable module and the fixed module, and the resilient element includes a bent portion electrically connected to the spring.

In an embodiment, the support mechanism further includes a circuit unit, and the fixed module comprises a conductive element electrically connecting to the resilient element and the circuit unit.

In an embodiment, the resilient element includes a spring sheet.

The present invention further provides a support mechanism for movably supporting a lens, including a fixed module, a movable module, a lens holder and a resilient element. The movable module is movably disposed in the fixed module, wherein the movable module has a substantially quadrilateral structure. The lens holder is movably disposed in the movable module for holding the lens. The resilient element is connected to an outer surface of the movable module and an inner surface of the fixed module, wherein the outer surface of the movable module is at a corner of the quadrilateral structure.

In an embodiment, the resilient element includes a first connecting surface and a second connecting surface, the first connecting surface is fixed on the outer surface of the movable module, and the second connecting surface is fixed on the inner surface of the fixed module, wherein the first connecting surface is not parallel to the second connecting surface.

In an embodiment, the resilient element further includes two second connecting surfaces, and the first connecting surface is between the second connecting surfaces.

In an embodiment, the resilient element includes a circular structure.

DETAILED DESCRIPTION OF THE INVENTION

Hereinafter, the embodiment of present invention will be described hereinafter with attached figures.

The abovementioned and other technical contents, features and effects relating to the present invention are clearly shown in the description of a preferred embodiment with reference figures. The directional phrases, such as on, under, left, right, front or rear are the directions relative to the reference figures. As a result, the directional phrases are only for illustration and is not intended to restrict this invention.

Figure 2A:
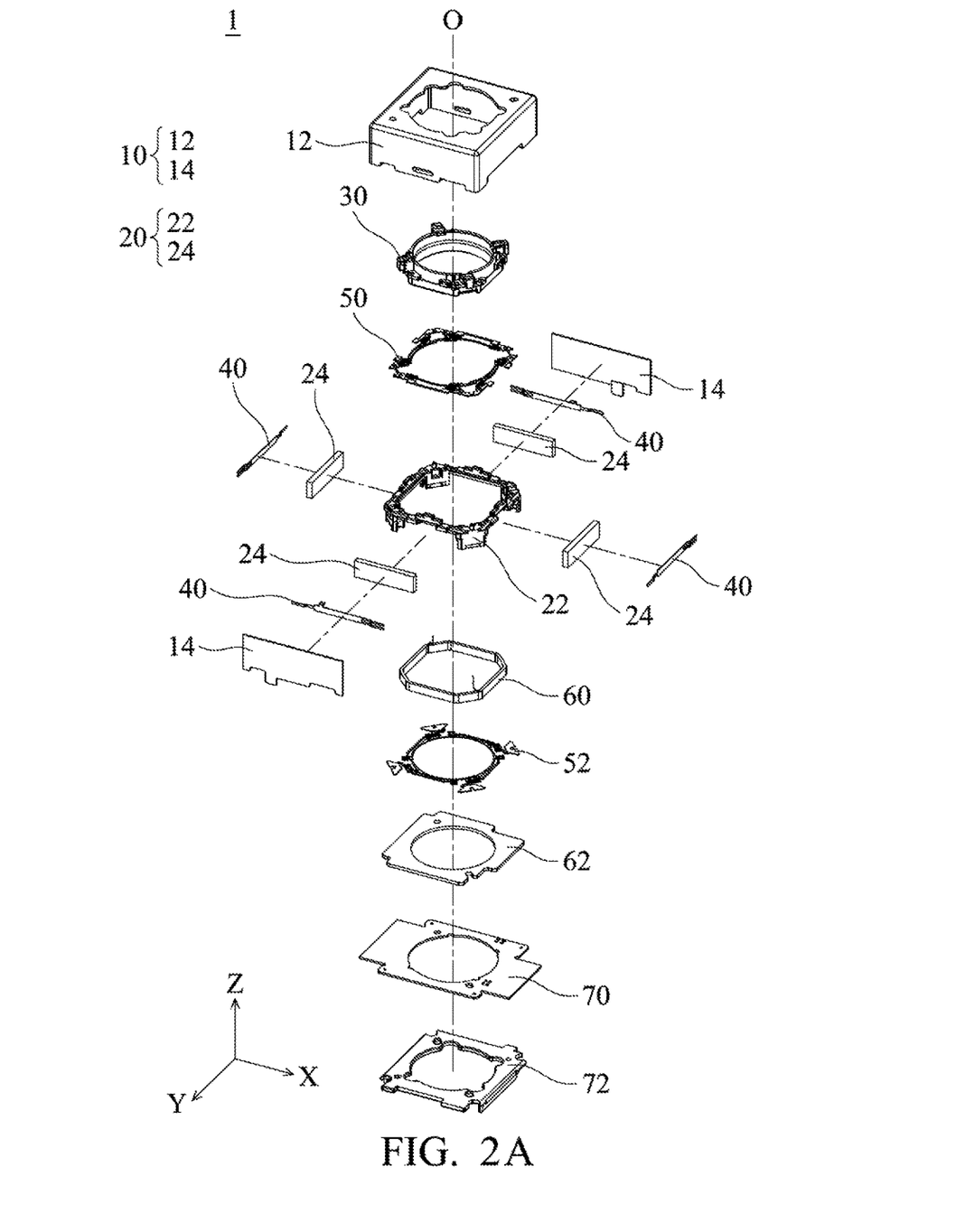
FIG. 2A is an exploded view of a support mechanism, according to an embodiment of the present invention.
Figure 2B:
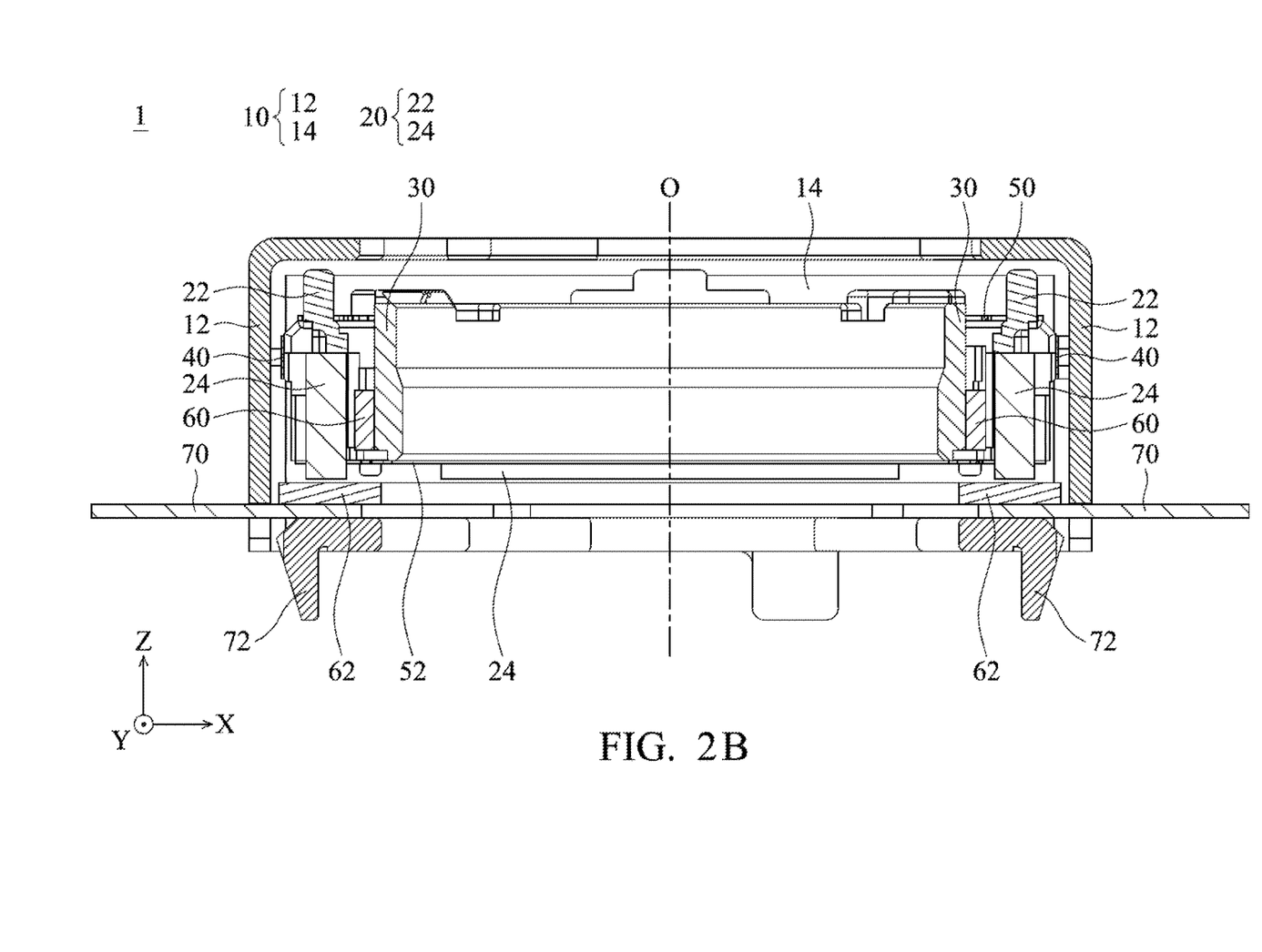
FIG. 2B is a cross-sectional view of the support mechanism in FIG. 2A after combining.
Figure 2C:
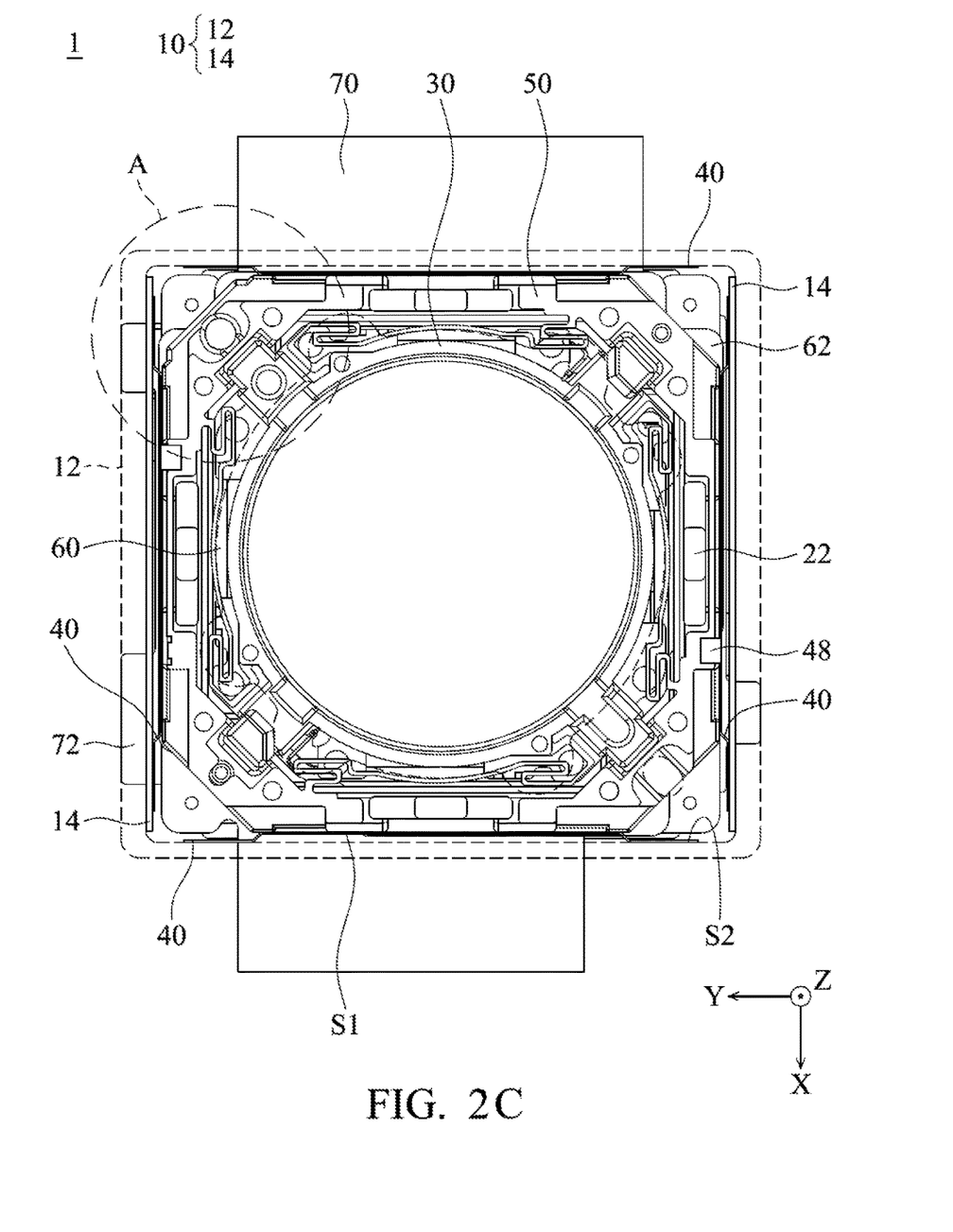
FIG. 2C is a top view of the support mechanism in FIG. 1 after combining and removing the case.

Referring to FIGS. 2A-2C. In an embodiment of the present invention, a lens support mechanism 1 may be disposed, for example, in a camera (or an electronic device with photographing function) to hold a lens, and it may be used to prevent or to suppress the problem of the image captured blurring caused from the camera vibration. It can be figured out from FIGS. 2A-2C that the support mechanism 1 mainly includes a case 12, at least a conductive element 14, a frame 22, at least a magnetic element 24, a lens holder 30, at least a resilient element 40, a first spring 50, a second spring 52, a first driving mechanism 60, a second driving mechanism 62, a circuit unit 70 and a base 72, wherein the case 12 and the conductive element 14 are fixed to each other to form a fixed module 10, and the frame 22 and the magnetic element 24 form a movable module 20 which may move relative to the fixed module 10. It should be noted that an image sensor (e.g. CCD, not shown) is disposed under the base 27, and a lens (not shown) corresponding to the image sensor is disposed in the lens holder 30. Coils corresponding to the magnetic elements 24 are disposed in the second driving element 62 to move the lens holder 30 and the lens therein by magnetic force to instantly correct the offset of the lens along X axis direction or Y axis direction, and thus achieving optical image stabilization and acquiring better image quality. Furthermore, the magnetic elements 24 may be shielded by other elements when viewed from top in this embodiment, so they are not shown in FIG. 2C.

Figure 2D:
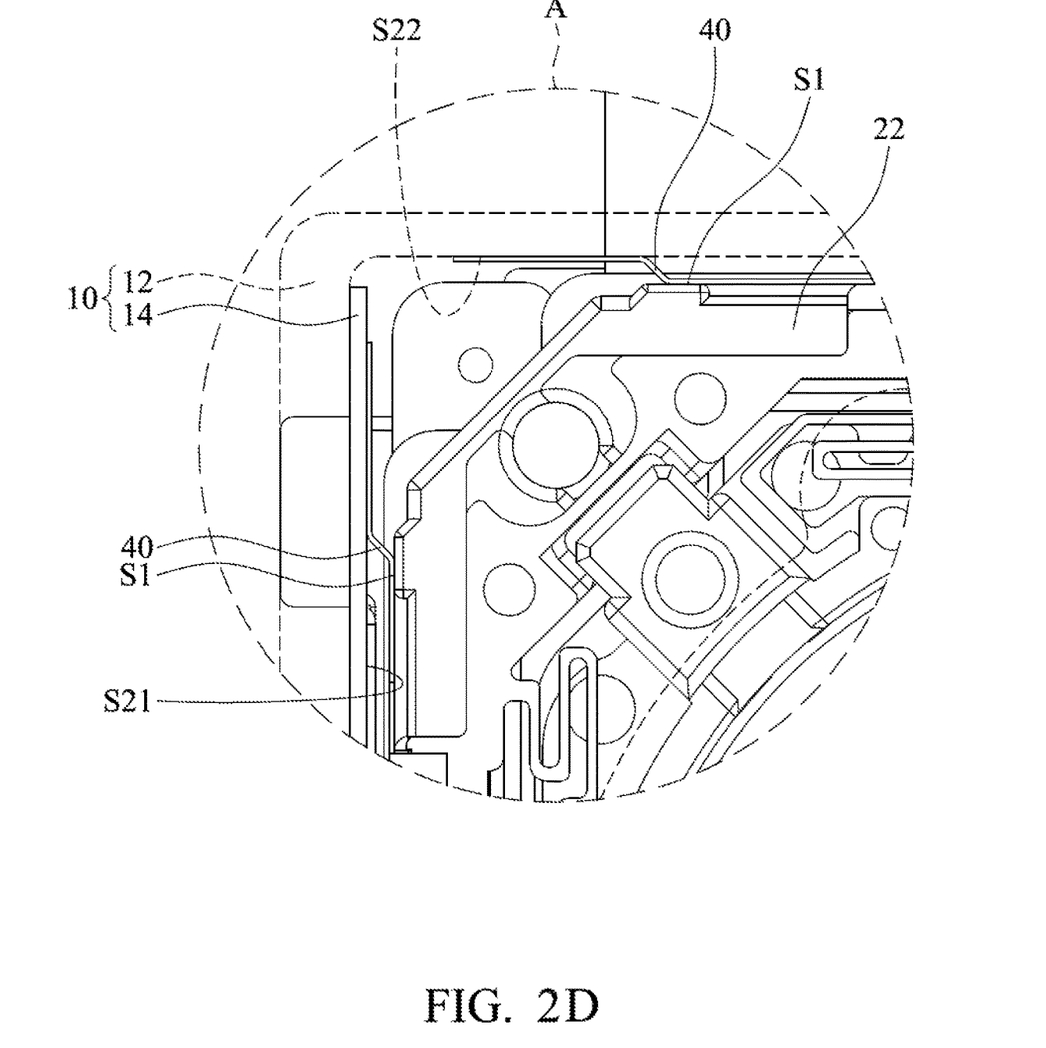
FIG. 2D is an enlarged view of the marked portion A in FIG. 2C.

As shown in FIGS. 2B-2C, the movable module 20 is movably disposed in the fixed module 10, and the lens holder 30 is movably disposed in the movable module 20 for holding the lens. It can be figured out from FIGS. 2C-2D that the resilient elements 40 at left and right sides are respectively connected to the outer surface S1 of the frame 22 and the inner surface S21 of the conductive element 14 along Y axis, and the outer surface S1 faces the inner surface S21. Furthermore, the resilient elements 40 at top and bottom sides are respectively connected to the outer surface S1 of the frame 22 and the inner surface S21 of the conductive element 14 along X axis. In other words, the resilient elements 40 only have to be connected to any outer surface of the movable module 20 (frame 22 or magnetic element 24) and any inner surface of the fixed module 10 (case 12 or conductive element 14), and is not limited by the embodiments of FIGS. 2B-2D. In this embodiment, the resilient element 40 is connected to the fixed module 10 and the movable module 20 to move the lens holder 30 and the lens disposed therein along the horizontal direction (i.e. X axis direction or Y axis direction) relative to the case 12 and the base 72 to perform optical image stabilization. No suspension wire is required to be disposed in this embodiment, so the height of the image capturing module along Z axis may be significantly reduced to meet the requirement of miniaturization of the electronic devices.

Figure 3:
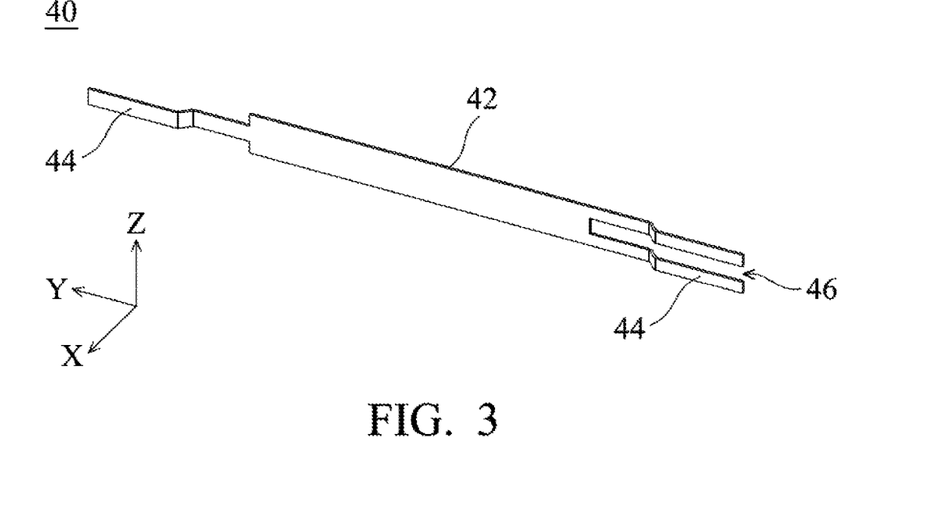
FIG. 3 is a schematic view of the resilient element in FIG. 2A.

FIG. 3 is a schematic view of the resilient element 40 in FIG. 2A. The resilient element 40 includes a first connecting surface 42 and at least a second connecting surface 44, wherein the first connecting surface 42 may be fixed on the outer surface S1 of the movable module 20 (e.g. the outer surface of the frame 22 or the magnetic element 24), the second connecting surface 44 may be fixed on the inner surface S2 of the fixed module 10 (e.g. the inner surface of the case 12 or the conductive element 14), and the first connecting surface 42 and the second connecting surface 44 are not perpendicular to optical axis O. In an embodiment, the first connecting surface 42 and the second connecting surface 44 are parallel to the optical axis O, but is not limited thereto. In this embodiment, the resilient element 40 is connected to the fixed module 10 and the movable module 20 in a surface contact manner, the connecting method may be welding or adhesion, but is not limited thereto. As a result, the movable module 20 may move along the horizontal direction (i.e. X axis direction or Y axis direction) relative to the fixed module 10 to perform the horizontal offset correction of the lens along X axis and Y axis directions. In this embodiment, the resilient element 40 is used as the connecting structure, wherein conventional connecting way is using suspension wire, so the lens may have less chance to tilt with respect to the Z axis direction.

Still referring to FIG. 3, the resilient element 40 substantially has an longitudinal shape and forms a U-shaped structure 46. The U-shaped structure 46 may increase contact area between the resilient element 40 and the fixed module 10/the movable module 20 to enhance the stability of the support mechanism 1. In an embodiment, the resilient element 40 may be a spring sheet and may be formed by metal sheet stamping, but is not limited thereto.

Figure 4:
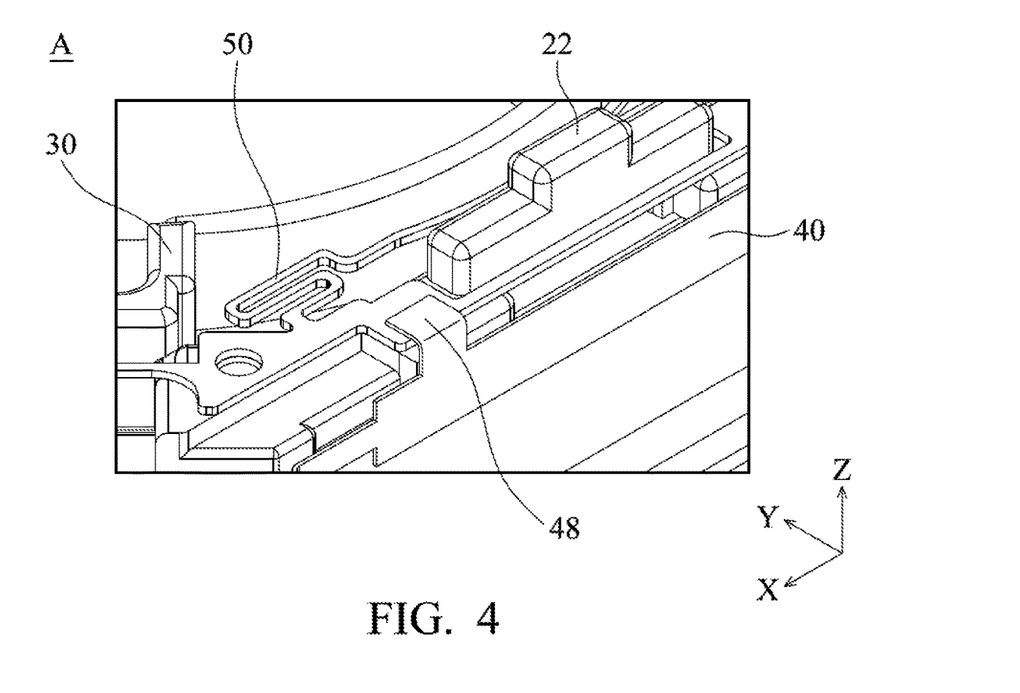
FIG. 4 is a schematic view of the resilient element electrically connecting to the spring, according to an embodiment of the present invention.

Referring to FIGS. 2A-2C and 4, the circuit unit 70 may provide current to the first driving element 60 and the second driving element 62 to perform auto focus and optical image stabilization functions, wherein the resilient element 40 may be electrically connected to the circuit unit 70 through the conductive element 14. As shown in FIG. 4, the resilient element 40 includes a bent portion 48 extended upward from sidewall of the frame 22 and bent toward the inner side of the frame 22, and thus electrically connects to a top surface of the first spring 50. As a result, the contact area of the resilient element 40 and the first spring 50 may be increased, so their bonding strength may be enhanced.

Figure 5:
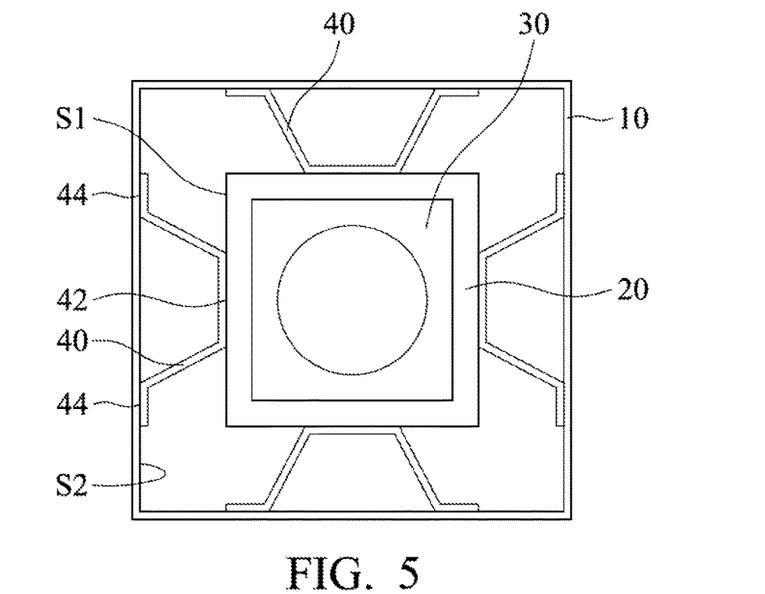
FIG. 5 is a schematic view of the resilient element connecting to the fixed module and the movable module, according to an embodiment of the present invention.

Referring to FIG. 5, which is a schematic view of the connection of the resilient element 40 and the fixed module 10 (e.g. the case 12 or conductive element 14 in FIG. 2B) and the movable module 20 (e.g. the frame 22 or magnetic element 24 in FIG. 2B), wherein the lens holder 30 is movably disposed in the movable module 20 for holding the lens. In this embodiment, the four resilient elements 40 are respectively connected to different sides of the fixed module 10 and the movable module 20. Furthermore, it can be figured out from FIG. 5 that the resilient element 40 includes a plurality of second connecting surfaces 44, wherein the first connecting surface 42 is between the second connecting surfaces 44, the first connecting surface 42 is connected to the center position of the outer surface S1 of the movable module 20, and the second connecting surface 44 is connected to the inner surface S2 of the fixed module 10. It should be noted that only two resilient elements 40 are respectively connected to the fixed module 10 and the movable module 20 in some embodiments, wherein the two resilient elements 40 are respectively at different sides of the movable module 20 and perpendicular to each other, but is not limited thereto.

Figure 6:
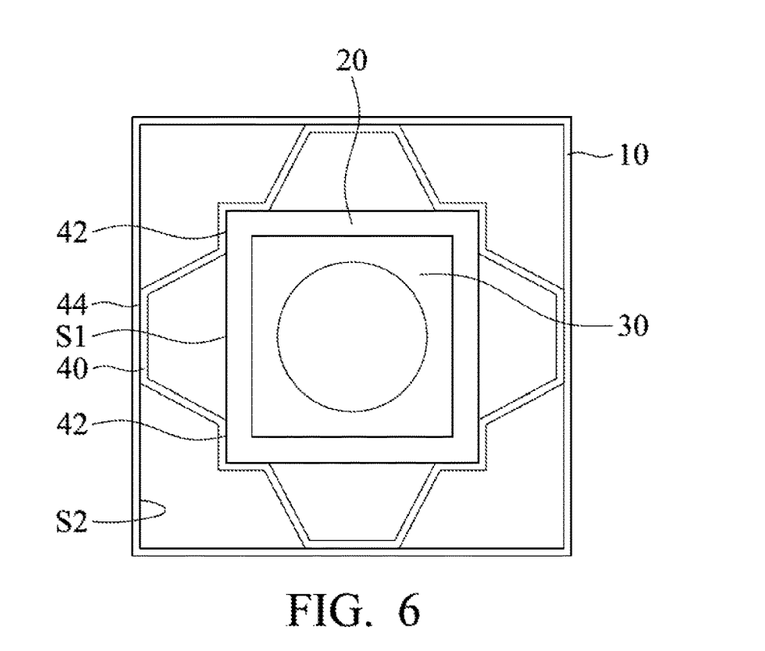
FIG. 6 is a schematic view of the resilient element connecting to the fixed module and the movable module, according to another embodiment of the present invention.

However, different types of resilient elements 40 may be used to connect the movable module 20 (e.g. the frame 22 or the magnetic element 24 in FIG. 2B) and the fixed module 10 (e.g. the case 12 or the conductive element 14 in FIG. 2B). As shown in FIG. 6, the resilient element 40 has a plurality of the first connecting surfaces 42 in this embodiment, wherein the second connecting surface 44 is between the two first connecting surfaces 42, each of the first connecting surface 42 of the resilient element 40 is connected to two opposite ends of the outer surface S1 of the movable module 20, and the second connecting surfaces 44 are connected to the inner surface S2 of the fixed module 10. In this embodiment, the movable module 20 and the fixed module 10 are connected by the resilient element 40, so no suspension wire is required, and thus the thickness of the image capturing module is reduced to meet the requirement of miniaturization of the electronic devices.

Figure 7:
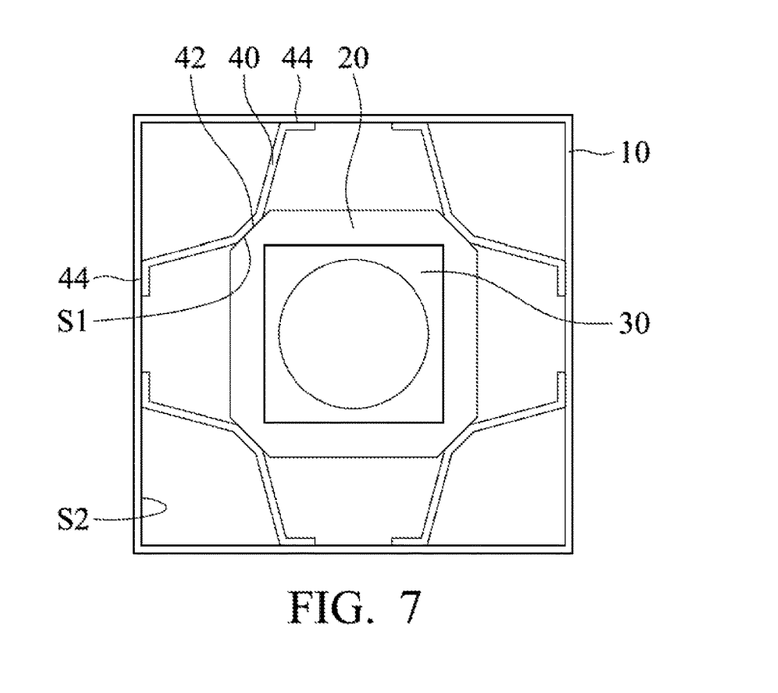
FIG. 7 is a schematic view of the resilient element connecting to the fixed module and the movable module, according to another embodiment of the present invention.

Referring to FIG. 7, which is a schematic view of the connection between the resilient element 40 and the fixed module 10 (e.g. the case 12 or conductive element 14 in FIG. 2B) and the movable module 20 (e.g. the frame 22 or magnetic element 24 in FIG. 2B), according to another embodiment of the present invention. The movable module 20 is movably disposed in the fixed module 10, wherein the movable module 20 substantially has a quadrilateral structure, and the lens holder 30 is movably disposed in the movable module 20 for holding a lens. It can be figured out from FIG. 7 that the resilient element 40 is connected to an outer surface S1 of the movable module 20 and an inner surface S2 of the fixed module 10, wherein the outer surface S1 is at a corner of the quadrilateral structure. In this embodiment, the resilient element 40 is disposed at the corner of the movable module 20, so the space at the corner of the movable module 20 may be fully utilized to miniature the volume of the image capturing module.

Referring to FIG. 7, the resilient element 40 includes a first connecting surface 42 and a plurality of second connecting surfaces 44, wherein the first connecting surface 42 is fixed on the outer surface S1 of the movable module 20, and the second connecting surfaces are fixed on the inner surface S2 of the fixed module 10. It should be noted that the first connecting surface 42 is not parallel to the second connecting surfaces 44, and the first connecting surface 42 is between the second connecting surfaces 44.

Figure 8:
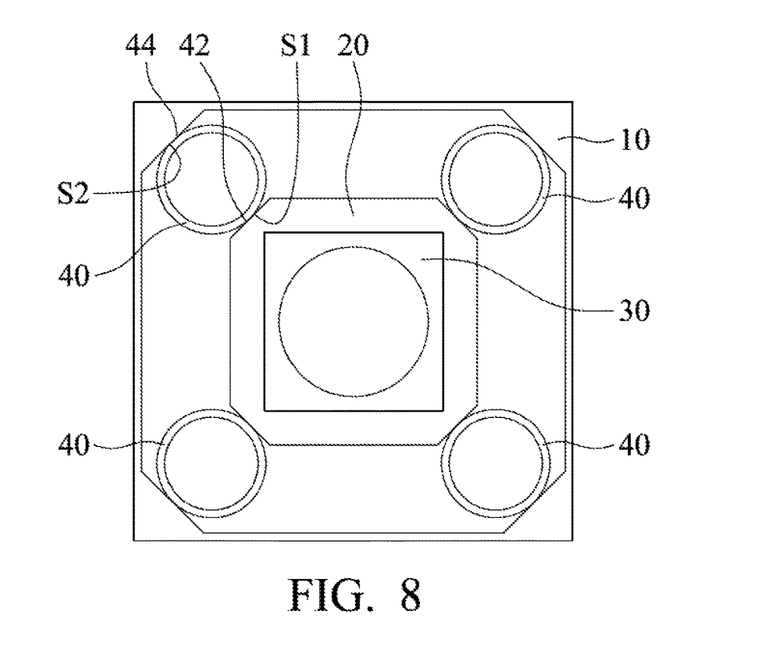
FIG. 8 is a schematic view of the resilient element connecting to the fixed module and the movable module, according to another embodiment of the present invention.

On the other hand, as shown in FIG. 8, the resilient element 40 may also has a circular structure to connect the movable module 20 (e.g. the frame 22 or the magnetic element 24 in FIG. 2B) with the fixed module 10 (e.g. the case 12 or the conductive element 14 in FIG. 2B), wherein the lens holder 30 is movably disposed in the movable module 20 for holding a lens. As a result, the lens may move along the horizontal direction (X axis direction or Y axis direction) relative to the fixed module 10.

In every embodiment of the present invention, the movable module 20 and the fixed module 10 are connected by the resilient element 40, so a conventional suspension wire is not required. As a result, it is harder to tilt the lens with respect to the Z axis direction, and the height of the image capturing module along the Z axis may be significantly reduced, meeting the requirement to miniaturize the electronic device.

The descriptions above are only embodiments of the present the disclosure, and should not be used to limit the present disclosure. For a person skilled in the art, various changes and variations may be included in the present disclosure. The features of the embodiments may be used together and depend on the requirements, and is not limited. Any variation, equivalent replacement and improvement in the spirit and principle of the present disclosure should be protected in the present disclosure.

What is claimed is:

1. A support mechanism for movably supporting a lens, comprising:
    a fixed module;
    a movable module, movably disposed in the fixed module;
    a lens holder, movably disposed in the movable module for holding the lens; and
    two resilient elements, connected to an outer surface of the movable module and an inner surface of the fixed module and connecting different sides of the movable module, wherein the outer surface of the movable module faces the inner surface of the fixed module, and the resilient elements are perpendicular to each other.

2. The support mechanism as claimed in claim 1, wherein at least one of the resilient elements comprises a first connecting surface and a second connecting surface, the first connecting surface is fixed on the outer surface of the movable module, and the second connecting surface is fixed on the inner surface of the fixed module.

3. The support mechanism as claimed in claim 2, wherein the first connecting surface and the second connecting surface are not perpendicular to an optical axis of the lens.

4. The support mechanism as claimed in claim 2, wherein the at least one of the resilient elements further comprises two second connecting surfaces, and the first connecting surface is between the second connecting surfaces.

5. The support mechanism as claimed in claim 4, wherein the first connecting surface is fixed on a center position of the outer surface of the movable module.

6. The support mechanism as claimed in claim 2, wherein the at least one of the resilient elements further comprises two first connecting surfaces, and the second connecting surface is between the first connecting surfaces.

7. The support mechanism as claimed in claim 6, wherein the first connecting surfaces are fixed on two opposite ends of the outer surface of the movable module.

8. The support mechanism as claimed in claim 2, wherein the at least one of the resilient elements is longitudinal and has a U-shaped structure connecting the movable module or the fixed module.

9. The support mechanism as claimed in claim 1, further comprising a spring connecting the movable module and the fixed module, and at least one of the resilient comprises a bent portion electrically connected to the spring.

10. The support mechanism as claimed in claim 1, which further comprises a circuit unit, and the fixed module comprises a conductive element electrically connecting to at least one of the resilient elements and the circuit unit.

11. The support mechanism as claimed in claim 1, wherein at least one of the resilient elements comprises a spring sheet.

12. A support mechanism for movably supporting a lens, comprising:
- a fixed module;
- a movable module, movably disposed in the fixed module, wherein the movable module has a substantially quadrilateral structure;
- a lens holder, movably disposed in the movable module for holding the lens; and
- a resilient element, connected to an outer surface of the movable module and an inner surface of the fixed module and comprising a first connecting surface and a second connecting surface, wherein the outer surface of the movable module is at a corner of the quadrilateral structure, the first connecting surface is fixed on the outer surface of the movable module, and the second connecting surface is fixed on the inner surface of the fixed module, wherein the first connecting surface is not parallel to the second connecting surface.

13. The support mechanism as claimed in claim 12, wherein the resilient element further comprises two second connecting surfaces, and the first connecting surface is between the second connecting surfaces.

14. The support mechanism as claimed in claim 12, wherein the resilient element comprises a circular structure.

\* \* \* \* \*